(12) United States Patent
Rathyen

(10) Patent No.: US 7,029,281 B1
(45) Date of Patent: Apr. 18, 2006

(54) EDUCATIONAL CARD GAME AND METHOD OF PLAY

(76) Inventor: Carol Rathyen, 36 Riveredge Rd., Tinton Falls, NJ (US) 07724

( * ) Notice: Subject to any disclaimer, the term of this patent is extended or adjusted under 35 U.S.C. 154(b) by 331 days.

(21) Appl. No.: 10/287,111

(22) Filed: Nov. 4, 2002

(51) Int. Cl.
G09B 19/22 (2006.01)

(52) U.S. Cl. ....................................... 434/129

(58) Field of Classification Search ................ 434/128, 434/129, 159, 167, 188; 273/292, 299, 302, 273/308

See application file for complete search history.

(56) References Cited

U.S. PATENT DOCUMENTS

| | | | | |
|---|---|---|---|---|
| 631,766 A | * | 8/1899 | Holman | 273/304 |
| 3,935,651 A | * | 2/1976 | Mankoff et al. | 273/302 |
| 4,679,796 A | | 7/1987 | Rein | |
| 4,801,149 A | | 1/1989 | Alnafissa | |
| 4,890,844 A | | 1/1990 | Weiss | |
| 5,141,235 A | * | 8/1992 | Hernandez | 273/308 |
| 5,180,306 A | * | 1/1993 | McInroy et al. | 434/129 |
| 5,417,432 A | * | 5/1995 | Dwyer | 273/299 |
| 5,439,232 A | | 8/1995 | Pollock | |
| 5,547,199 A | * | 8/1996 | Calhoun | 273/299 |
| 5,568,924 A | * | 10/1996 | Katsuren | 273/292 |
| 5,788,503 A | * | 8/1998 | Shapiro et al. | 434/172 |
| 5,836,587 A | * | 11/1998 | Druce et al. | 273/296 |
| 5,863,043 A | * | 1/1999 | Bitner | 273/299 |
| 5,951,297 A | * | 9/1999 | Schwartz | 434/167 |
| 6,065,970 A | * | 5/2000 | Elliott | 434/209 |
| 6,099,318 A | * | 8/2000 | McLeod et al. | 434/129 |

* cited by examiner

Primary Examiner—Kurt Fernstrom
(74) Attorney, Agent, or Firm—Brian K. Johnson, Esq., LLC

(57) ABSTRACT

An entertaining and educational card game utilizing a question and answer format. The game is comprised of a plurality of nonstandard decks of playing cards. Each card has a question and answer which aggregately cover a wide range of subject matter. Players acquire cards by answering questions correctly. Sets of cards must be completed in order to win rounds of play. The game features a method of play which allows players more than one opportunity to correctly answer questions.

5 Claims, 4 Drawing Sheets

EDUCATIONAL CARD GAME AND METHOD OF PLAY

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF INVENTION

This invention pertains to a card game, and more specifically, a card game which is both entertaining and educational.

DISCUSSION OF PRIOR ART

U.S. Pat. No. 4,679,796 to Rein (1987) describes a problem-solving game. A problem is presented on one side of a card, and on the reverse side there are two associated clues and the answer to the problem. Questioned players attempt to solve problems in order to score points. If a player does not solve a problem, on his next turn he is given a different problem.

U.S. Pat. No. 4,801,149 to Alnafissa (1989) describes educational playing cards. Each card has at least one question-and-answer set along with other indicia. All the cards are dealt out, and players select one of their cards and ask the questions on it to their opponents. When all questions on a card have been answered, either correctly or incorrectly, the card is placed on a discard pile.

U.S. Pat. No. 4,890,844 to Weiss (1990) describes an educational board game in which a figurative expression is illustrated on one face of a card, and the figurative expression and its definition are on the opposite face of the card. Players draw cards from a deck and read the figurative expressions to answering players. The answering players are shown the illustrations of the figurative expressions and are required to give the correct definitions. Cards that are not answered correctly are discarded.

U.S. Pat. No. 5,439,232 to Pollock (1995) describes an educational card game which requires players to identify objects that are illustrated on the front side of cards. Answers are on the back side of the cards. A player selects one card from a deck and observes the front of the card. If the player correctly identifies the object illustrated, he is awarded points. If the player does not correctly identify the object, he does not receive any points and the card is returned to the rear of the deck.

U.S. Pat. No. 5,836,587 to Druce (1998) describes playing cards for an educational game. Along with other indicia, each card has at least one question-and-answer set on its front face. Players draw the top card from a pile of cards to determine which question will be asked. When the question on a card has either been answered correctly, or incorrectly answered by players, the card is returned to the bottom of the pile.

It is the intention of several educational card games to enhance a player's knowledge by utilizing a question-and-answer format. Prior art shows, however, that when players have answered questions on cards incorrectly, the cards are discarded or placed at the bottom of a pile of cards. This method of play suggests that a player may not be asked the same question again during the course of a game. Therefore, players are not provided an incentive to remember the correct answers.

Learning is enhanced by repetition, and teaching tools such as flash cards utilize this approach. Flash cards, however, provide little entertainment and lack the enjoyment of a competitive challenge.

SUMMARY

This invention is an entertaining and educational card game comprising a plurality of nonstandard decks of playing cards. The cards of each deck bear a question and answer, along with other indicia related to completing sets of cards. The questions are all different from each other, and aggregately cover a wide range of subject matter. A small number of cards are dealt to each player. The cards are held fanned out, with their back sides facing opponents. Each player, in turn, selects a card from an opponent's hand. He is then asked the question on the card. If he answers the question correctly, he acquires the card. If he does not answer the question correctly, he is shown the correct answer, and the card is then returned to the opponent's hand. The object of the game is to acquire cards necessary to complete sets of cards, thereby winning rounds of play. Cards bearing incorrectly answered questions are not discarded. They remain in play, giving players additional opportunities to select the cards again. This advantageous method of play provides players with an incentive to commit answers to memory, thereby learning the many facts presented in the game.

DETAILED DESCRIPTION OF A FIRST EMBODIMENT

Figure 1:
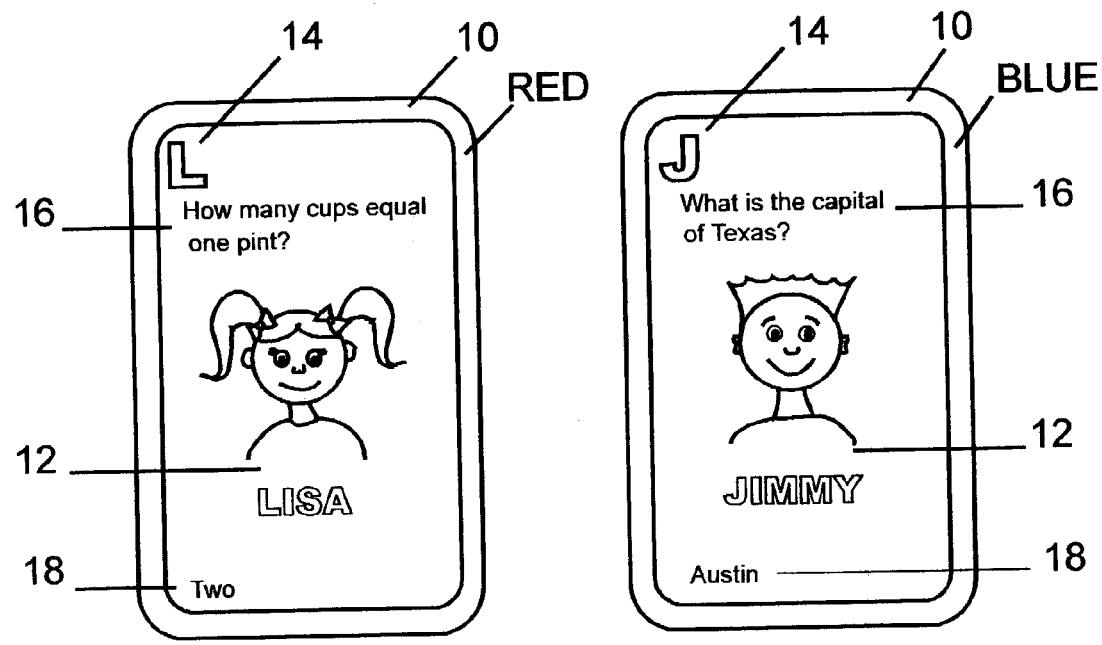
FIG. 1 illustrates two cards, each from a different deck of cards, according to a first embodiment.

This invention comprises a plurality of nonstandard decks of playing cards, each deck having 50 cards. The cards of all decks are identical on their back sides. The cards of all decks have indicia on their front sides. FIG. 1 illustrates two cards, each from a different deck of cards. The indicia on the front faces of all cards include:

(a) a color indicium, advantageously a border of color 10, which serves to differentiate the plurality of decks, with all the cards of one deck having the same color border but being different from the color border on the cards of each other deck;

(b) a pictorial indicium and name-label, advantageously a cartoon-type character and name-label 12, which also serves to differentiate the plurality of decks, with all the cards of one deck having the same cartoon-type character and name-label but being different from the cartoon-type character and name-label on the cards of each other deck;

(c) a letter of the alphabet 14, which corresponds to one or more of the letters of the alphabet in the name-label appearing on the same card; and
(d) a question 16 on the upper portion of each card, and the answer to the question 18 on the lower portion of each card, with all questions varying and covering a wide range of subject matter.

Figure 2:
FIG. 2 illustrates a perspective view of a token.

This invention also comprises a plurality of tokens. FIG. 2 illustrates a token. The tokens are used to keep track of the number of rounds each player wins, one token being given to the winning player of each round. This method of keeping score is desirably uncomplicated, and eliminates the need for a scorepad and writing implement.

Figure 3:
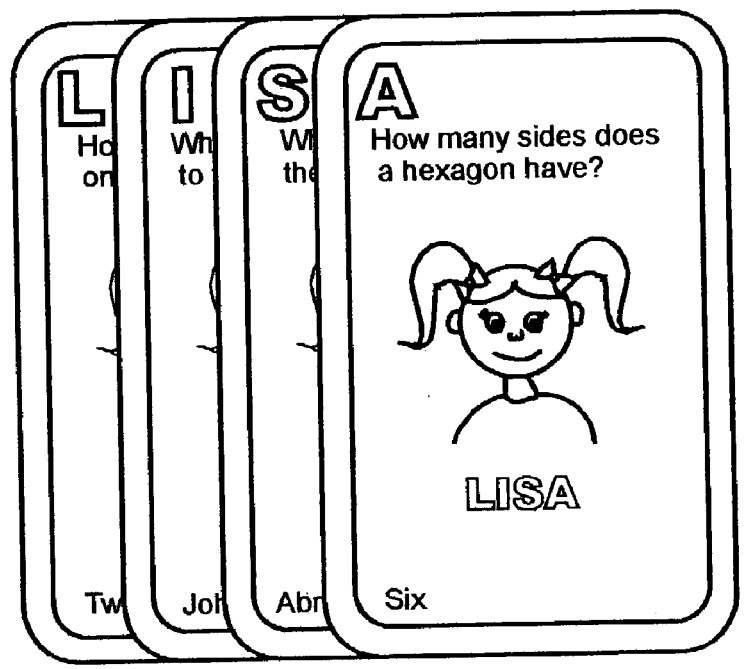
FIG. 3 illustrates two sets of cards, each from a different deck of cards, according to a first embodiment.
Figure 3:
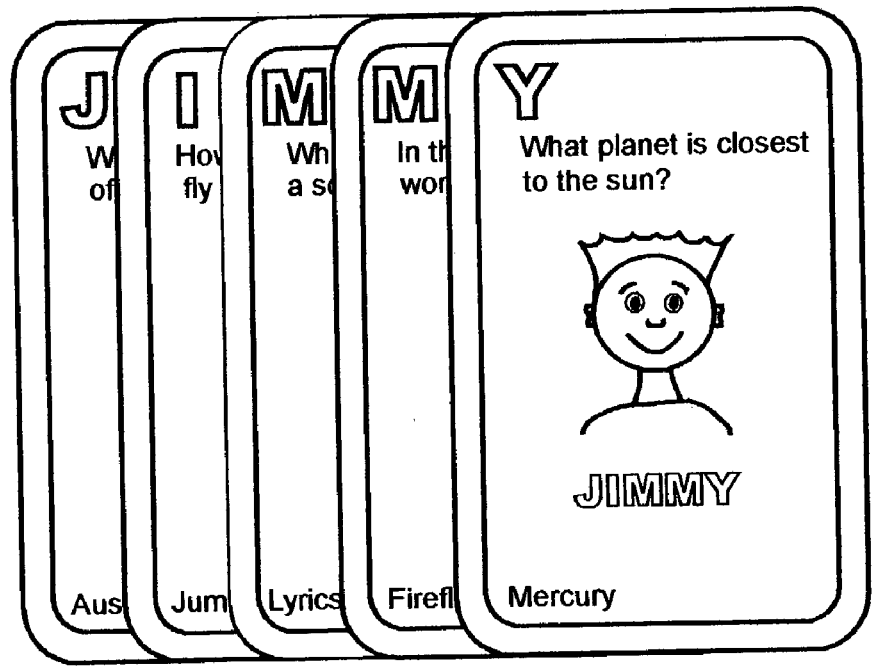

The game can be played by two or three individual players, or two or three teams of players. One deck of cards is required for each individual player, or each team of players, and each deck of cards must be different from each other deck of cards. The object of the game is to win rounds of play by acquiring the cards necessary to complete "sets" of cards. A set of cards is a number of cards belonging to the same deck, their alphabetic letters spelling out the name of the cartoon-type character that appears on the cards. FIG. 3 illustrates two sets of cards, each from a different deck. One set of cards, from each deck being utilized, is required to win a round. Therefore, two sets of cards are required for two individuals or teams, and three sets of cards are required for three individuals or teams.

Before play begins, players determine how many tokens a player must acquire in order to win the game. Players also determine the amount of time each player will have to answer a question, and whether or not a timer will be used. These determinations can be made by any method, (e.g., group concensus, flip of a coin, etc.).

The method of play differs somewhat in accordance with the number of individual players or the number of teams, and so will be discussed separately. The method of play for two individual players is as follows.

Two unlike decks of cards are thoroughly shuffled together. One player is chosen to be the first to deal, and deals 5 cards to each player. The remainder of the cards are placed face down on the playing surface, and is referred to as the "draw pile." The top card of the draw pile is turned face up and placed next to the draw pile, forming the "discard pile." Each player holds his 5 cards fanned out with the back sides facing his opponent. The 5 cards being held by each player is referred to as a "hand."

To begin play, the player who did not deal is the starting player. In future rounds, the starting player is the player who lost the previous round. The starting player, Player 1, selects one card from Player 2's hand by lifting the card upward, but not removing it. Player 2 then takes the selected card and reads aloud the question on it. Player 1 must then answer the question.

If Player 1 answers the question correctly, he acquires the card. He then has the option of either keeping the card, or trading it for the top card of the discard pile. The card he chooses to keep is placed face up on the playing surface in front of him, starting his first set of cards. The cards required to complete a set of cards do not have to be acquired in any specific order. Player 2 then takes a card from the draw pile to replenish his hand. All players are required to maintain a hand of five cards. Players are not given an additional turn for answering questions correctly, which lessens the advantage a more knowledgeable player has over opponents.

If Player 1 does not answer the question correctly, then he is shown the face of the card. He looks at the correct answer, and tries to commit it to memory. On a later turn, he may select the card again. Player 2 then returns the card to his hand and rearranges his cards so that Player 1 does not know where that card is located. It is then Player 2's turn to select a card from Player 1's hand, and the game proceeds as described for Player 1.

Play continues in this manner with each player trying to complete two sets of cards, one from each deck. As illustrated in FIG. 3, the cards of each set of cards are layed out horizontally across the playing surface in front of each player.

When an acquired card, or the card it could be traded for, is not needed for a player's sets of cards, the card must be discarded. The player's turn then ends. Players may not keep any card that gives them more of one letter than is needed to complete a set of cards. For example, to spell out the name "BRITNEY," only one "Y" is needed. A player may not keep a card having the letter "Y" on it if he already has one.

During a round of play, if one player realizes that his opponent has kept a card that gives him more of one letter than is needed, he announces it, and the offending player must discard the unneeded card. Additionally, the player who announced the error gets to choose one other card from the offending player's related set of cards, and it too must be discarded. This rule is designed to deter a player from intentionally, or unintentionally, keeping a card their opponent needs. If a player himself realizes he has kept a card that gives him more of one letter than is needed, he announces it, and puts the unneeded card on the discard pile. No penalty is imposed.

The player who completes both required sets of cards, is the winner of the round and receives a token. To begin the next round, each player retains his hand, but all cards that are face up in front of players are gathered together and shuffled with the cards in the discard pile. The shuffled discard pile is then placed face up next to the draw pile. The player who lost the round becomes the starting player in the next round.

If the cards in the draw pile are depleted, then the discard pile is turned over to form a new draw pile. The top card of the new draw pile is turned face up and placed next to the draw pile to form a new discard pile.

The player who receives the predetermined number of tokens is the winner of the game.

The method of play for three individual players is the same as described for two individual players, but for the following modifications:
(a) three unlike decks of cards are used;
(b) to begin play, the starting player is the player to the left of the dealer, and in future rounds, the starting player is the player to the left of the player who won the previous round;
(c) players have the option of selecting cards from either of their opponents' hands;
(d) when a player answers a question incorrectly, only that player is shown the correct answer; and
(e) three sets of cards, one from each deck, are required to win a round.

The method of play for teams of players is the same as described for individual players, with each team being considered as one individual player.

DESCRIPTION OF A SECOND EMBODIMENT

Figure 4:
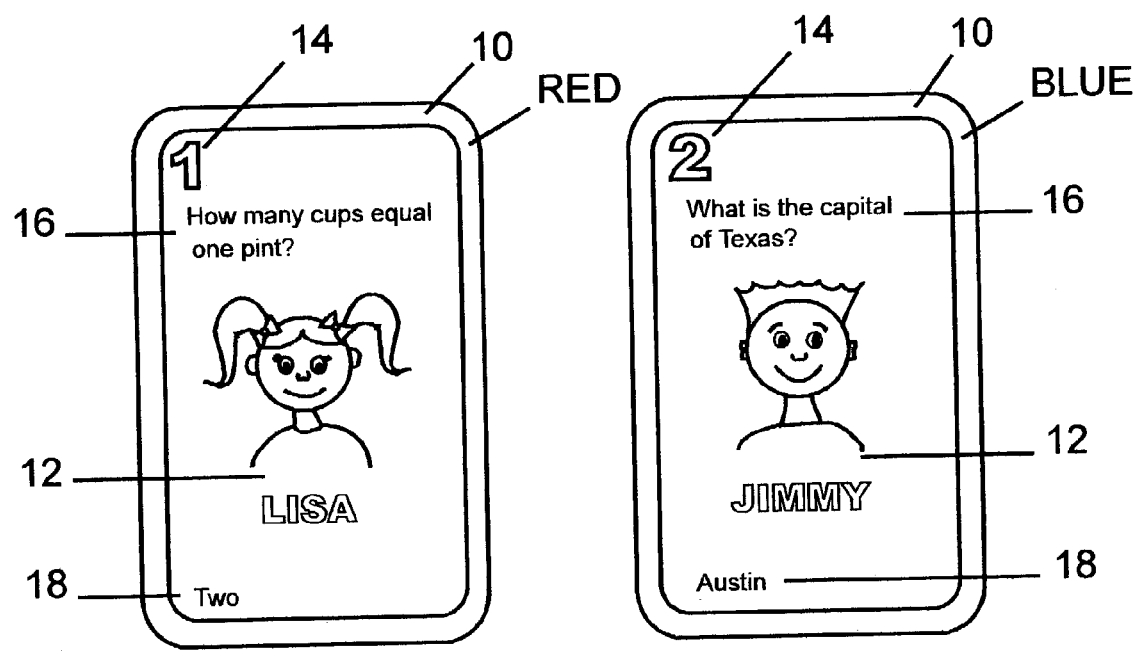
FIG. 4 illustrates two cards, each from a different deck of cards, according to a second embodiment.
Figure 5:
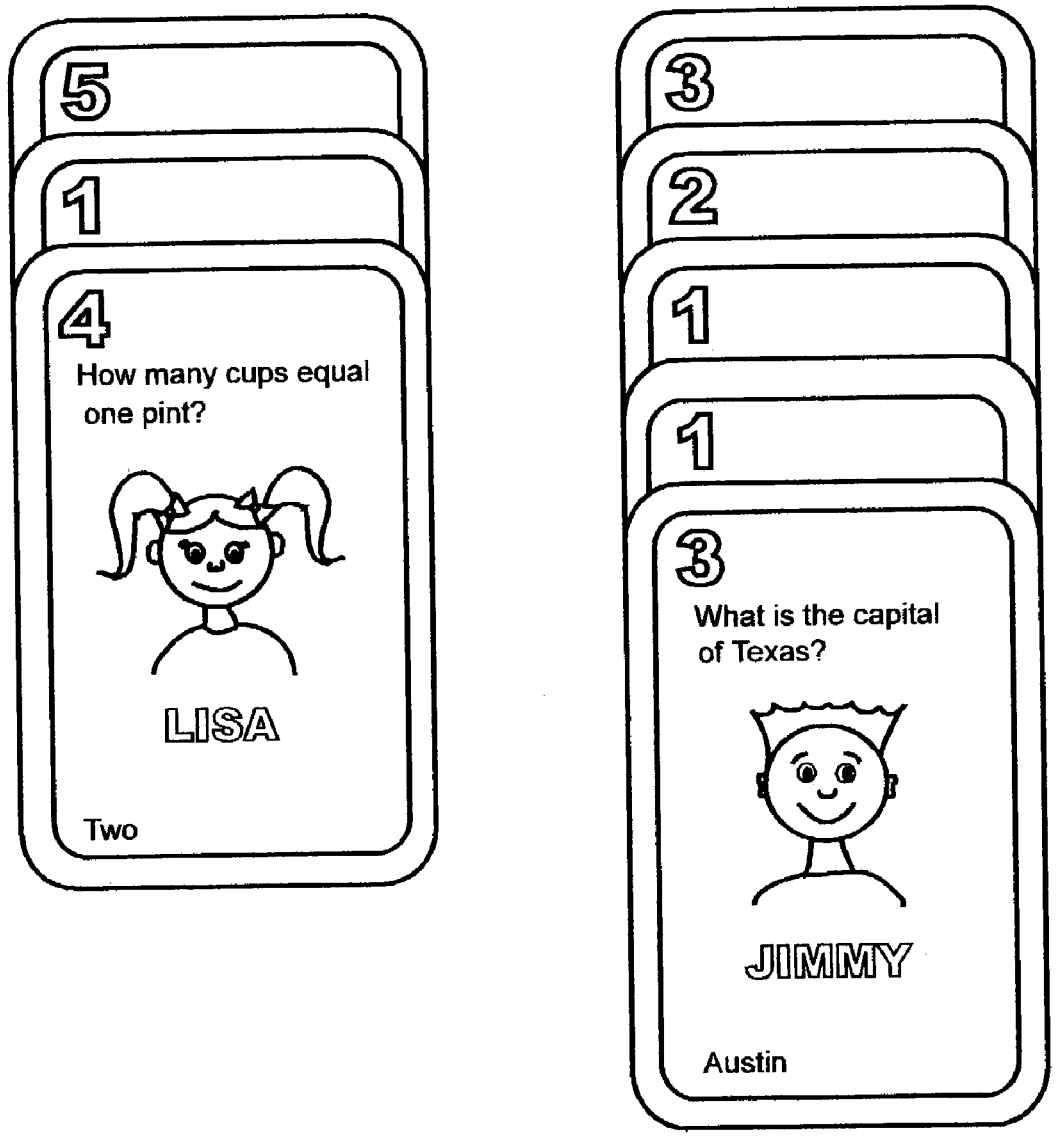
FIG. 5 illustrates two sets of cards, each from a different deck of cards, according to a second embodiment.

In a second embodiment of this invention, the front sides of each card have a number, rather than a letter of the alphabet. All other indicia being the same as in a first embodiment. FIG. 4 illustrates two cards, each from a different deck of cards. The numbers represent the point value of each card, with advantageously fifteen cards of each deck having the number one, nine cards of each deck having the number two, nine cards of each deck having the number three, nine cards of each deck having the number four, and eight cards of each deck having the number five. A complete set of cards is any number of cards belonging to the same deck, that exactly totals ten. FIG. 5 illustrates two complete sets of cards, each from a different deck. Players may not keep cards that would cause any of their sets of cards to go over ten points.

Many variations of the described embodiments are possible. Additionally, this invention could be modified to accommodate a computer or video game system, with players selecting cards by way of a mouse, keyboard, or video control device, and with answers in a multiple choice format.

From the descriptions above, many advantages of this invention become evident:

(a) Players are given more than one opportunity to learn the correct answers to questions, since cards with incorrectly answered questions are returned to a player's hand to be selected again.

(b) Players are not given an additional turn for answering questions correctly. This lessens the advantages a more knowledgeable player has over opponents.

(c) Players have the added fun of trying to guess which card in an opponent's hand bears a question they have previously learned the answer to.

(d) Players retain their hands from one round to the next so that any incorrectly answered questions are not taken out of play.

(e) The use of tokens to keep score makes scorekeeping easy and uncomplicated.

This invention should not be considered as limited by the specific embodiments described. Thus the scope of this invention should be determined by the appended claims, and their legal equivalents, rather than by the examples given.

I claim:

1. A method of card playing comprising:
   (a) dealing a hand of playing cards comprising a nonstandard decks of playing cards, to each of a plurality of players;
   (b) requiring a player to select a playing card from the hand of an opponent; said opponent reading aloud a question imprinted on said playing card; and said player answering said question;
   (c) allowing said player, if said player answered said question correctly, to acquire said playing card; and
   (d) revealing said answer to said player, if said player answers said question incorrectly and retaining said playing card in said opponent's hand.

2. The method of play as in claim 1 wherein said hand of playing cards includes five cards.

3. The method of play as in claim 1 wherein said nonstandard deck of cards is one deck within a plurality of nonstandard decks of playing cards and each card within each of said decks contains cards having a front side and a back side, each of said back sides being identical to each other, each of said front sides having a question and answer, a letter of an alphabet, a character and a name-label, and a border of color; each of said cards of each deck having the same said character and name-label, but being different from said character and name-label on the cards of each other deck; said method further comprising collecting a set of said cards, the letters of said set spelling said name-label.

4. The method of play as in claim 1 wherein said plurality of players is three individual players or three teams of players.

5. The method of play as in claim 1 further comprising: receiving a token for winning a round of play.

* * * * *